United States Patent [19]

Yasuda et al.

[11] Patent Number: 4,741,294

[45] Date of Patent: May 3, 1988

[54] INERTIA SUPERCHARGING INDUCTION SYSTEM FOR MULTI-CYLINDER INTERNAL COMBUSTION ENGINE

[75] Inventors: Makoto Yasuda, Yokohama; Syousabu Ura, Fujisawa; Shuichi Nishimura; Isaya Matsuo, both of Yokohama; Masami Kato; Munehiro Sagata, both of Nagoya, all of Japan

[73] Assignees: Nissan Motor Co., Ltd., Yokohama; Aichi Machine Industry Co., Ltd., Nagoya, both of Japan

[21] Appl. No.: 810,685

[22] Filed: Dec. 19, 1985

[30] Foreign Application Priority Data

Dec. 21, 1984 [JP] Japan .............................. 59-270368

[51] Int. Cl.⁴ .............................................. F02B 75/18
[52] U.S. Cl. .............................................. 123/52 MV
[58] Field of Search .......... 123/52 M, 52 MB, 52 MV

[56] References Cited

U.S. PATENT DOCUMENTS

| | | | |
|---|---|---|---|
| 3,796,048 | 3/1974 | Annus et al. | 123/52 M |
| 4,300,488 | 11/1981 | Cser | 123/52 M |
| 4,510,896 | 4/1985 | Rutschmann | 123/52 MB |
| 4,513,699 | 4/1985 | Cser | 123/52 MB |
| 4,549,506 | 10/1985 | Rush et al. | 123/52 MB |

FOREIGN PATENT DOCUMENTS

| | | |
|---|---|---|
| 0159803 | 3/1985 | European Pat. Off. . |
| 46-21123 | 7/1971 | Japan . |
| 56-115818 | 9/1981 | Japan . |
| 58-129063 | 9/1983 | Japan . |
| 60-230510 | 11/1985 | Japan . |

Primary Examiner—Charles J. Myhre
Assistant Examiner—David A. Okonsky
Attorney, Agent, or Firm—Foley & Lardner, Schwartz, Jeffery, Schwaab, Mack, Blumenthal & Evans

[57] ABSTRACT

In order to minimize the supercharging effect from the cylinder to cylinder and to maximize the efficiency of the inertia supercharging effect over essentially the whole engine speed range, first and second elongate collectors which communicate with separate banks of cylinders are interconnected at essentially their mid points by a connection tube having a selected length and cross-sectional area. An engine speed responsive valve disposed in the tube or pipe selectively induces the situation wherein quasi separate induction systems are defined for each bank of cylinders or a single enlarged system is established.

8 Claims, 7 Drawing Sheets

INERTIA SUPERCHARGING INDUCTION SYSTEM FOR MULTI-CYLINDER INTERNAL COMBUSTION ENGINE

BACKGROUND OF THE INVENTION

1. Field of the Invention

The present invention relates generally to multi-cylinder internal combustion engines and more specifically to an induction system for such an engine which enables good inertia supercharging during both high and low engine speed operation.

2. Description of the Prior Art

Figure 1:
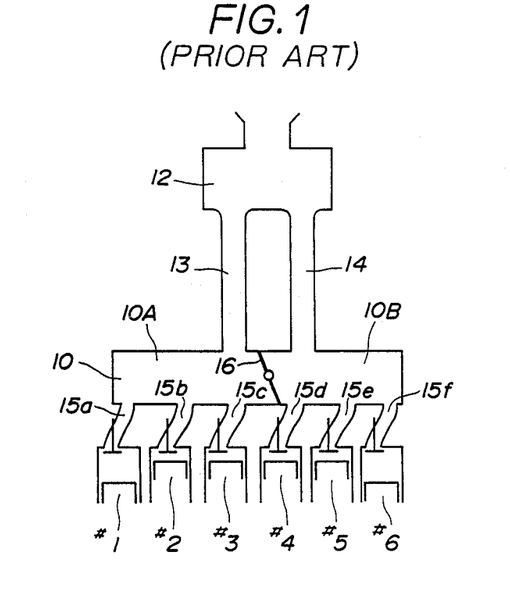
FIG. 1 shows in schematic form the prior art arrangement discussed in the opening paragraphs of the present disclosure.

FIG. 1 of the drawings shows an induction arrangement disclosed in Japanese Patent Application First Provisional Publication No. 56-115818. This arrangement as shown, comprises a single elongate collector 10 which communicates with a surge tank 12 via first and second interconnecting induction conduits 13, 14. Each of the engine cylinders #1 to #6 communicate with the collector 10 via branch runners 15a–15f. A valve 16 is disposed in the collector 10 so as to divide the same into first and second sections 10A, 10B. The first section 10A communicates with a first group of engine cylinders #1 to #3 while the second section 10B communicates with the remaining cylinders #4 to #6. When the engine is operating at low speed valve 16 is closed.

The ignition order of the first and second groups of cylinders are respectively discontinuous. Accordingly, when the engine is operating at low engine speed and the valve 16 is closed the first and second groups of cylinders aspirate through mutually independent induction systems. The dimensions of the conduiting etc., of the induction arrangement is selected so that resonance characteristics of the two "quasi" independent systems are such as to coincide with the induction pressure pulsations under low engine speed condition and thus induce good inertia ram charging (supercharging). Upon the engine speed exceeding a predetermined level valve 16 opens and induces the situation wherein the natural frequency of the single enlarged system under such conditions matches the induction pressure pulsations which occur at this time.

However, this arrangement encounters the drawback in that although the system is relatively simple, upon opening of valve 16 the charging effect provided in branch runners 15c and 15d which are located close to the valve and the charging effect provided at branch runners 15a and 15f (remote from valve 16) are not the same. Accordingly, charging efficiency varies from one cylinder to another and optimal engine performance is not obtained.

Further examples of the above type of induction system are found in Japanese Patent Utility Model First Prov. Pub. No. 58-129063 and Japanese Patent Utility Model Second Prov. Pub. No. 46-21123.

SUMMARY OF THE INVENTION

It is an object of the present invention to provide an induction system which provides good inertia supercharging characteristics under both high and low engine speed operations and wherein the variation in supercharging effect between cylinders is minimized in a manner which improves engine performance under both modes.

In brief, the above object is achieved by an arrangement wherein the cylinders of the engine are divided into first and second groups or banks wherein the ignition sequence of the respective groups is discontinuous; and wherein the induction system for supplying air to the first and second group of cylinders is characterized by: a first elongate collector section with which the first group of cylinders fluidly communicate via branch runners, the first collector section having first and second ends; a second elongate collector section fluidly discrete from the first collector section and with which the second group of cylinders fluidly communicate via branch runners, the second collector section having first and second ends; a surge tank; first and second conduits leading from the surge tank to the first and second collector sections respectively, the first and second conduits fluidly communicating with the first and second collector sections at the respective first ends thereof; conneciton passage leading from a location essentially mid-way between the ends of the first collector section to a location essentially mid-way between the ends of the second collector section; and a valve disposed in the connection passage, the valve being arranged to assume a closed position wherein communication between the first and second collector sections is prevented and an open position wherein communication is permitted, the valve being arranged to change from the closed position to the open position upon the magnitude of a selected operational parameter of the engine exceeding a predetermined level.

With the above defined invention it is possible to arrange an induction manifold for a V-6 engine in a manner that the collector sections are located side by side and essentially parallel with an elongate surge tank. The difference in the lengths of the conduits which interconnect the surge tank with the respective collectors with such an arrangement is compensated for by varying the volumes of the two collectors in a manner which achieves a suitable balance in resonance characteristics. By arranging the connection tube to have an essentially U-shape and to lie on tp of the side-by-side collectors, a highly compact arrangement results.

BRIEF DESCRIPTION OF THE DRAWINGS

The features and advantages of the arrangement present invention will become more clearly appreciated from the following description taken in conjunction with the accompanying drawings in which.

DETAILED DESCRIPTION OF THE PREFERRED EMBODIMENTS

Figure 2:
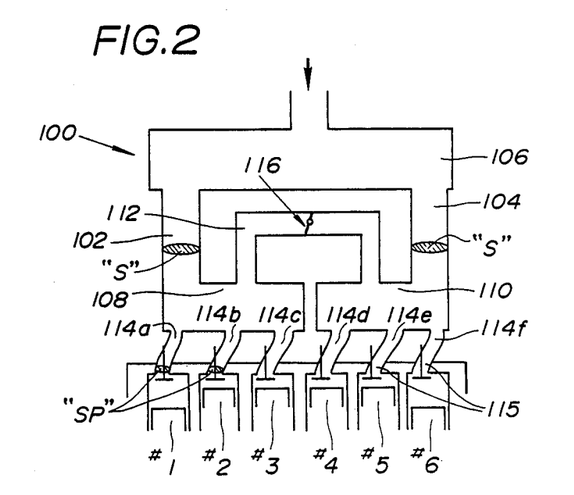
FIG. 2 shows in schematic form the induction system arrangement which characterizes the present invention.
Figure 3:
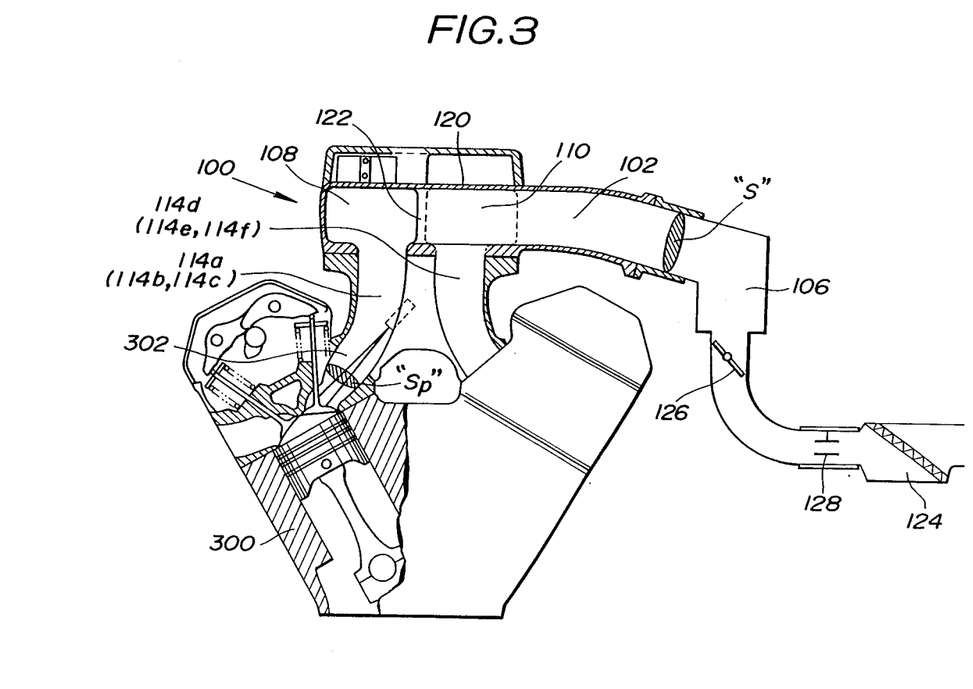
FIG. 3 is a sectional elevation of an embodiment of the present invention.

Before proceeding to describe an actual embodiment of the present invention it is deemed advantageous to firstly turn to FIG. 2 wherein the basic arrangement of the present invention is set forth in schematic form.

As will be appreciated the arrangement of the present invention is such that the induction manifold 100 includes induction conduits 102, 104 which lead from the surge tank 106 and communicate with the ends of collectors 108 110, and a connection pipe 112 leads from a location essentially mid-way between the ends of collector 108 to a location essentially mid-way between the ends of collector 110. The branch runners 114a–114f which communicate the two collector sections 108, 110 with the combustion chambers of cylinders #1 to #6 via induction ports 115 are arranged to branch-off from the collectors at essentially equally spaced intervals. A valve 116 is disposed in the connection pipe 112.

Figure 10:
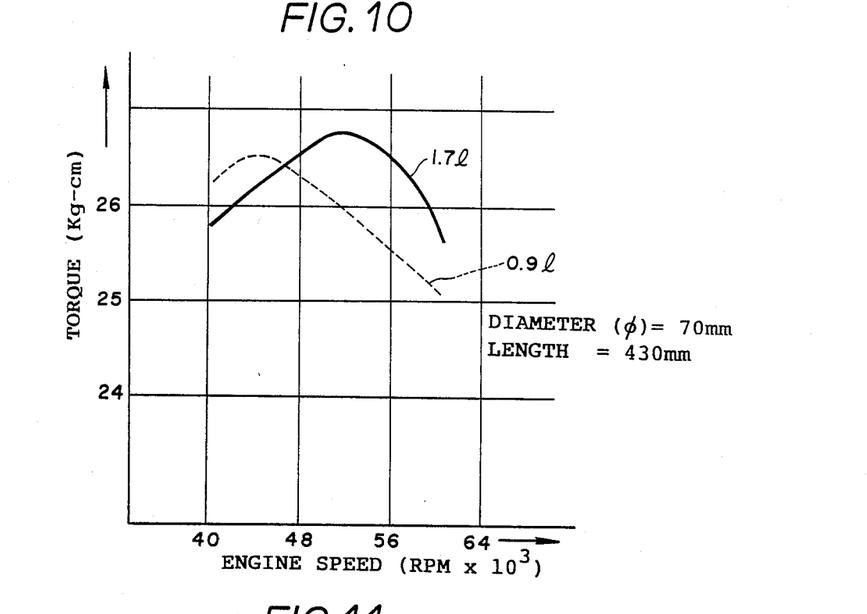
FIG. 10 is a graph showing the effect of change of volume of the collector sections on the torque generation characteristics of the engine.

Experiments have shown that it is preferable to arrange for the volume the collectors 108, 110 to be in excess of half of the engine displacement. Viz., as shown in FIG. 10 given that the displacement of the engine is 3 liters (2960 cc), the length of the induction conduits 102, 104 which interconnect the surge tank 106 and the collectors, is 430 mm and the diameter of the same 70 mm, when the volume of the collectors 108, 110 are arranged to be 0.9 liter the output of the engine is markedly lower than if the capacity thereof is slightly greater than half of the engine displacement (viz., 1, 700 cc).

Figure 11:
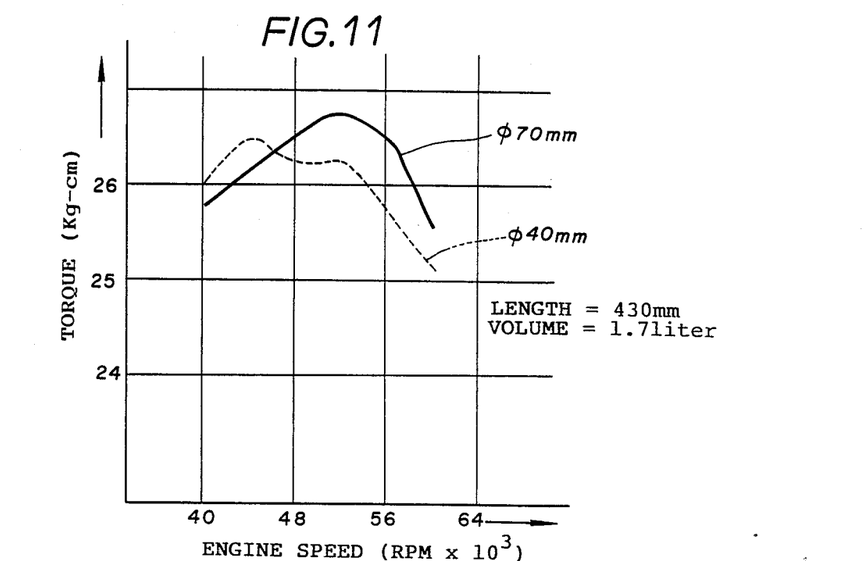
FIG. 11 is a similar graph showing the effect of induction conduit diameter (cross-sectional area) on the engine output.

Experiments wherein the diameter of the induction conduits 102, 104 was varied while holding the volume of the collectors 108, 110 and the length of the induction conduits 102, 104 constant at 1.7 liter and 430 mm respectively; revealed that a diameter of 70 mm gave superior engine performance over an arrangement wherein the diameter was reduced to 40 mm.

Figure 12:
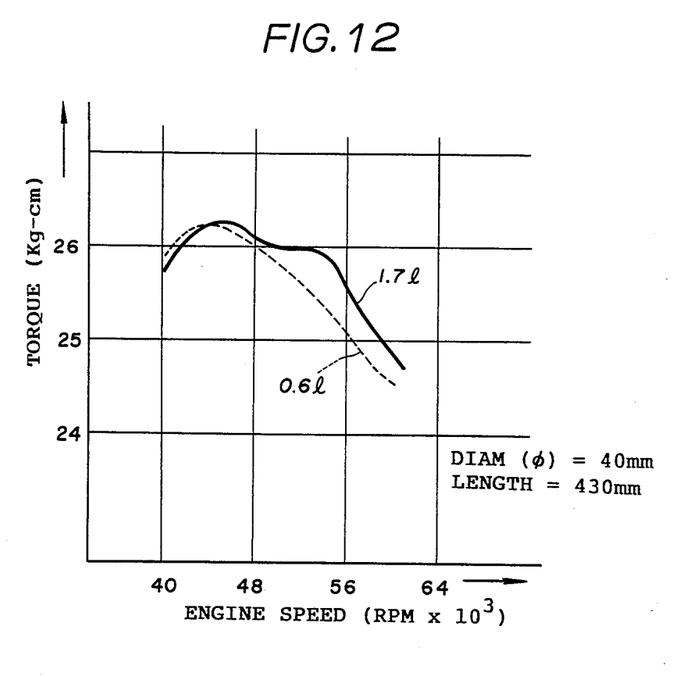
FIG. 12 is a graph showing the the effect of changing the volume of the collectors on the engine output with the cross-sectional area of the induction conduits set at a relatively small value.

To confirm the above results experiments wherein the volume of the collectors 108, 110 were varied with an induction arrangment wherein the length and diameter of the induction conduits were held constant at 430 mm and 40 mm respectively. As shown, when the volume of the collectors was 1.7 liter the torque developed by the engine was notably better than when the volume was reduced to 0.6 liter.

Figure 7:
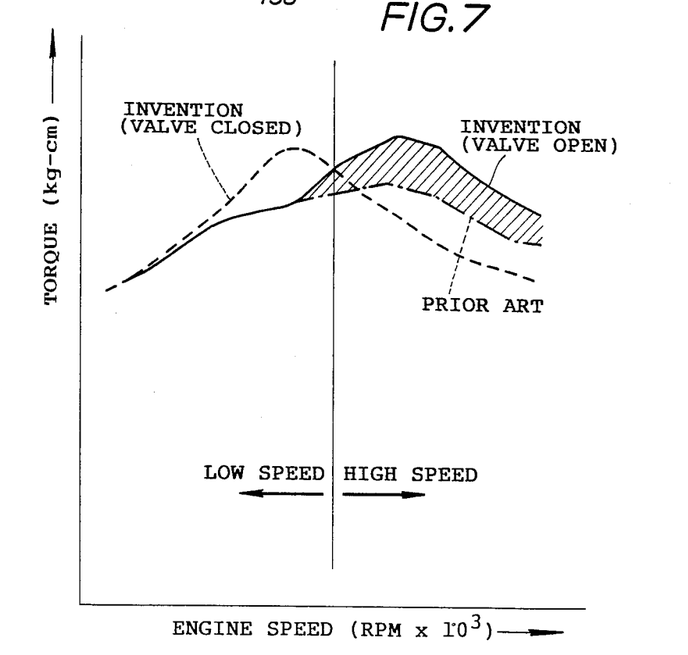
FIG. 7 is a graph showing in terms of engine torque and engine rotational speed, a comparison of the torque characteristics derived using the prior art arrangement shown in FIG. 1 and the present invention.
Figure 8:
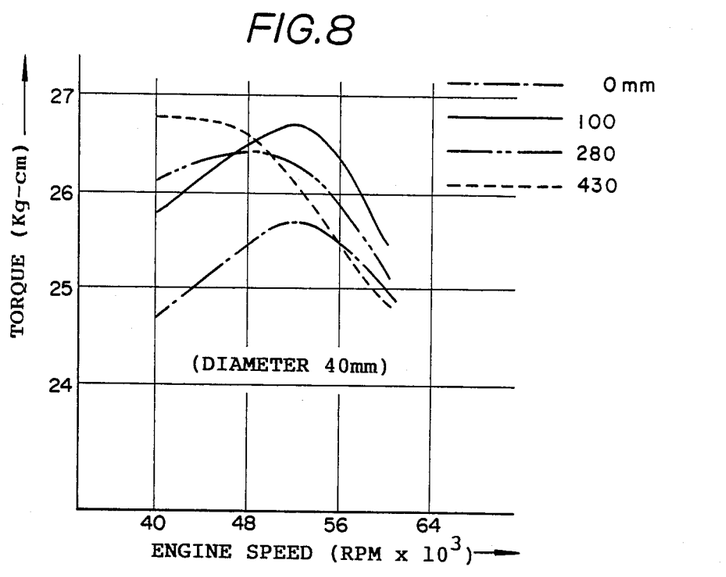
FIG. 8 is a graph showing in terms of engine torque and engine speed, the change in torque developed by an engine equipped with the arrangement of the present invention when the length of the connection pipe which bridges the two inducton collectors is varied.
Figure 9:
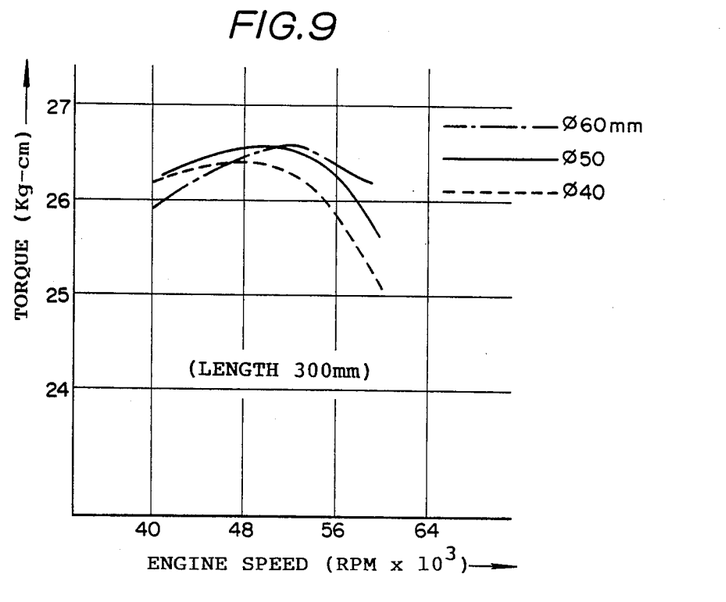
FIG. 9 is a graph also in terms of engine torque and speed showing the effect of change in diameter (viz., cross-sectional area) of the connection pipe on the engine torque characteristics.

As will become clear herinlater with a discussion of the graphs of FIGS. 7 to 9, by using the above described arrangement and by selecting the length and diameter of the connecting pipe 112 in conjunction with the dimensions of the remaining system, it is possible to achieve an engine performance which is notably better than that achieved with the FIG. 1 arrangement.

The diameter of the engine induction ports 115 in the engine tested was 42 mm. Accordingly, from the above data it was determined tha the cross-sectional area of the induction conduits should be greater than 2.5 times the cross sectional area of the induction ports 115.

Subsequent experiments (which will be dealt with in more detail hereinlater) revealed that given the above mentioned manifold specifications, it is preferable for the connection pipe 112 to be 100 mm to 430 mm in length (viz., 0.33 to 1.5 times the length of collectors 108, 110 and therefor about the sum of the diameters of three cylinders; and to be 40-60 mm in diameter.

FIG. 8 shows the results of experiments which were conducted in order to the detect the effect of changing the length of the connection pipe 112 on the torque produced by the engine. it will be noted that the diameter of the pipe was held constant at 40 mm.

As shown, all of the pipes tested showed better torque generation characteristics over an arrangement wherein the two collectors were communicated directly (viz., via a pipe having a zero length).

FIG. 9 shows the results of tests conducted to determined the optimum diameter (viz., the cross-sectional area) of connection pipe 112. During these tests the length of the pipe was held constant at 300 mm. As will be appreciated the engine performance did not vary to any particular degree when pipes having 40, 50 and 60 mm diameters were used. However, in order to avoid any marked changes in internal volume of the induction system it is deemed appropriate that the diameter of the pipe be arranged to close to or within the above mentioned range.

With the above described specifications when the engine is operating a low engine speeds, the resonance characteristics of the induction system with the vale 116 closed, match the pressure pulsations which occur in the induction system and induce the engine to produce torque which varies as shown by chain line in FIG. 7. Upon opening of valve 116 the collecltors 108 and 110 become communicated via connection pipe 112 whereby the distance of the intake system ahead of the intake ports 115 is increased by only the distance between the runners 114a and 114b so that the system becomes resonant with short wavelength pulsations which are produced under such conditions. The torque generation characteristics with the valve 116 open are depicted in FIG. 7 by the solid line trace. As will be appreciated the torque produced by the engine with the present invention is higher than that produced by the prior art arrangement shwn in FIG. 1 of the drawings, the torque generation characteristics of which are denoted by the chain line trace in the same figure. The difference between the invention and the prior art which occurs with the valve open and the engine operating at high engine speed is highlighted by hatching in FIG. 7.

As will be appreciated it is advantageous to select the point at which the valve is switched from its closed position to its open one so that a sharp change in torque generation is not experienced. Viz., it is advantageous to select the changeover point to be conincident with the engine speed at which the chain line trace intersects the solid line one.

FIGS. 3 to 6 show an actual embodiment of the present invention as applied to a 2960 cc displacement V-6 type engine.

Figure 4:
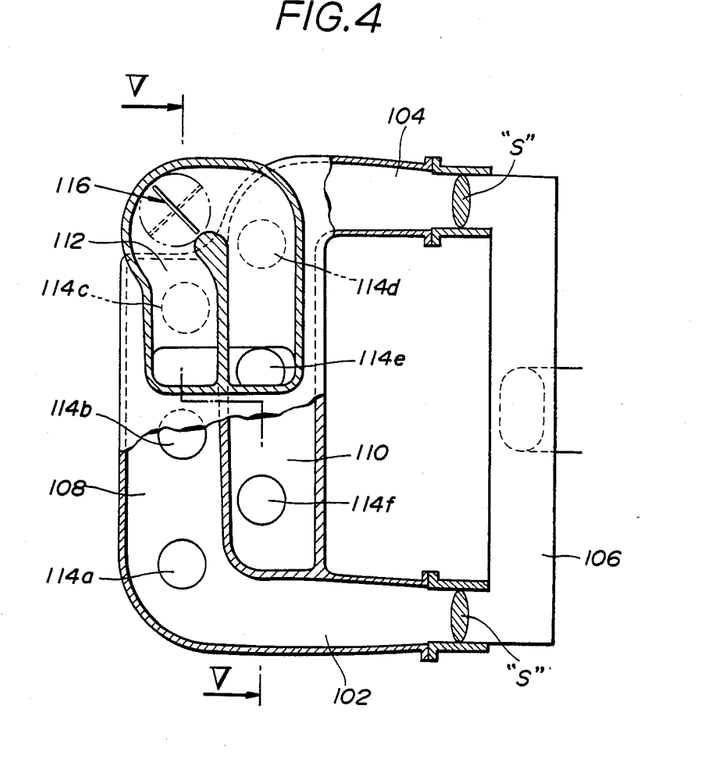
FIG. 4 is a sectional plan view of the induction manifold used in the arrangment shown in FIG. 3.

In this arrangement the induction manifold 100 is arranged above and between two banks of three c2ylinders of a V-6 engine 300. As shown, the branch runners 114a-114f in this embodiment lead upwardly from the intake ports 302 the engine and open into the bottom their respective collector sections 108, 110. As best seen in FIG. 4 the collector sections are defined in a housing 120 which is partitioned by wall 122 which extends essentially parallel with the longitudinal axis of the engine. The induction conduits 102, 104 blend into the ends of the collectors 108, 110 and lead to the surge tank 106.

In this arrangement, the surge tank 106 is, as best seen in FIG. 4, elongate and arranged to extend parallel to the collector housing 120. The surge tank 106 is arranged to communicate with the an air cleaner 124 via a conduit arrangement including a throttle valve 126 and an air flow meter 128 (in this embodiment the air flow meter is depicted as being, merely by way of example, a hot wire/vortex type).

The connection pipe 112 in this embodiment is advantageously arranged to have an essentially U-shape (see FIG. 4) and to lie flat on the top or "roof" of the collector housing 120. The valve 116 which has a construction as best seen in FIG. 6 is arranged to located in the U-shaped connection pipe 116 at a location adjacent the end of collector section 108. With this arrangement an actuator 130 of the valve 116 may be arranged to depend into the space available at this point (see FIG. 5).

FIG. 6 shows the construction of the valve 116 and actuator 130 in detail. In this embodiment the valve 116 includes a vane 132 which is secured to one end of a rotable shaft 134. Roller bearings 136, 138 rotatably journal the shaft 143. The actuator which may be any suitable type (viz., for example electrical, electrical/mechanical, pneumatic or the like) is disposed in a cup-shaped housing 140 and between the roller bearings 136, 138.

Figure 5:
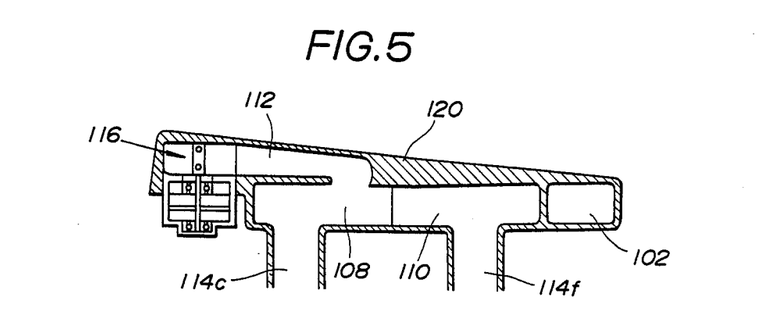
FIG. 5 is a sectional view taken along section line V—V of FIG. 4.
Figure 6:
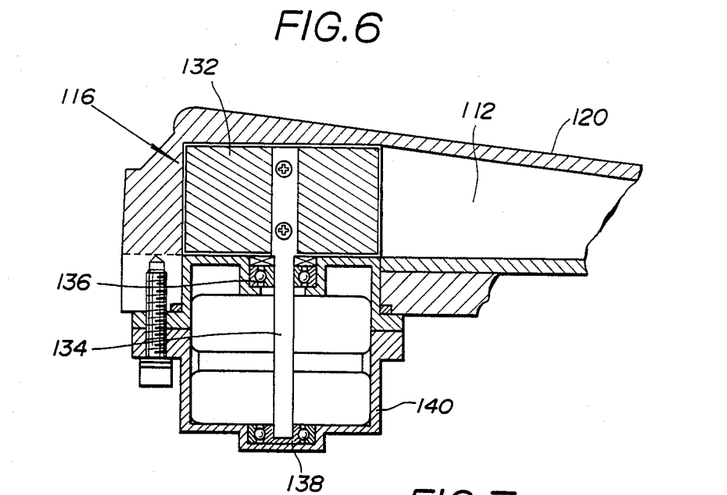
FIG. 6 is an enlarged sectional view of the valve shown in FIG. 5.

As will be best appreciated from FIG. 5, by arranging the cross-section of the collector sections 108, 110 and induction conduits 102, 104 to be essentially rectangular in shape, the height of the induction manifold can be kept to a minimum and the arrangement rendered highly compact. Arranging the longitudinal vertical cross-section of the U-shaped connection pipe to be slightly wedge shaped tends to minimize the height increasing effect of placing the same on top of the housing 120.

In the instant embodiment the displacement of the engine is 2960 cc, the volumes of the collectors 108 and 110 are 1.9 and 1.6 liters respectively (the sum being greater than the engine displacement), and the volume of the surge tank 106 is arranged to be 3 liters and thus act as the free ends of the system through which the pressure waves pass.

It will be noted that with the instant embodiment as the arrangement of the induction passages and the collectors is not symmetrical it is necessary to vary the volumes of the collectors slightly so as to achieve a unification in the supercharging effect on the two group of cylinders. The performance characteristics of the this embodiment are essentially as shown in FIG. 7.

With the above described embodiment as the valve 112 is located at a high position the possibility that any water which might have entered the system will not collect therein and induce the possibility that under very cold conditions that the valve will freeze in a closed state.

It will also be noted that although the connection pipe is illustrated as being cast integrally with the remaining portions of the housing 120 it is possible to provide same as a separate detachable unit.

What is claimed is:

1. In a non-supercharged mult-cylinder V-type internal combustion engine:
    a first group of cylinders, said first group of cylinders having a discontinuous ignition sequence, said first group of cylinders being aligned to define a first bank of cylinders of said V-type engine;
    a second group of cylinders, said second group of cylinders having a discontinuous ignition sequence, said second group of cylinders being aligned to define a second bank of cylinders of said V-type engine which second bank is arranged parallel to said first bank of cylinders; and
    a naturally aspirated induction system for supplying air to said first and second groups of cylinders, said naturally aspirated system comprising:
    a first elongate collector section, said first collector section being fluidly communicated with the cylinders of said first group of cylinders, said first collector section being arranged essentially parallel with said first group of cylinders and having first and second ends;
    a second elongate collector section, said second collector section being fluidly communicated with the cylinders of said second group of cylinders, said second collector being arranged parallel with said second group of cylinders and having first and second ends, the first and second ends of said second collector section being located adjacent the first and second ends of said first collector section, respectively;
    said first and second collector sections being defined in the same housing and located above and essentially between the first and second banks of cylinders;
    an air cleaner;
    a surge tank fluidly communicated with said air cleaner, said surge tank being arranged parallel with said first and second collector sections and between said air cleaner and said first and second collector sections, said surge tank having first and second ends;
    a first induction conduit leading from a first end of said surge tank to a first end of said first collector section;
    a second induction conduit leading from a second end of said surge tank to a second end of said second collector section, said second induction conduit passing the second end of said first collector section;
    an essentially U-shaped connection passage fluidly interconnecting said first and second collector sections at locations essentially mid-way between the first and second ends thereof, said connection passage being disposed above said first and second collector sections and arranged so that the curved portion thereof is located proximate the first ends of said first and second collector sections;
    a valve disposed in said connection passage; and
    a motor for operating said valve, said motor being arranged below the lower surface of said connection passage and proximate the first end of said second collector section, said motor being arranged to be selectively operable in response to the value of an engine operational parameter exceeding a predetermined level to move said valve from a closed position to an open one.

2. An internal combustion engine as claimed in claim 1, wherein said first group of cylinders comprises three cylinders and said second group of cylinders comprises three cylinders.

3. An internal combustion engine as claimed in claim 1, wherein each of said cylinders includes a combustion chamber which communicates with the a runner via an induction port, said induction port having a predetermined cross-sectional area.

4. An internal combustion engine as claimed in claim 1, wherein said engine has a predetermined displacement and wherein each of said collector sections has an internal volume which is greater than half of engine displacement.

5. An internal combustion engine as claimed in claim 3, wherein said induction conduits have a cross-sectional area which is at least 2.5 times the cross-sectional area of said induction ports.

6. An internal combustion engine as claimed in claim 1, wherein said connection passage has a length which is 0.33 to 1.5 times that of one collector section.

7. An internal combustion engine as claimed in claim 1, wherein said first and second collector sections are arranged side by side, and wherein said surge tank is elongate and is arranged to extend essentially parallel to the said collector sections, wherein said connection pipe has an essentially U-shape and is disposed flat on top of said first and second collectors.

8. An internal combustion engine as claimed in claim 1, wherein said first and second induction conduits are not equal in length and wherein the volumes of said first and second collector sections are different.

* * * * *